Sept. 15, 1931.    G. B. EGGERT    1,823,441
PROOFER
Filed Aug. 5, 1929    4 Sheets-Sheet 1
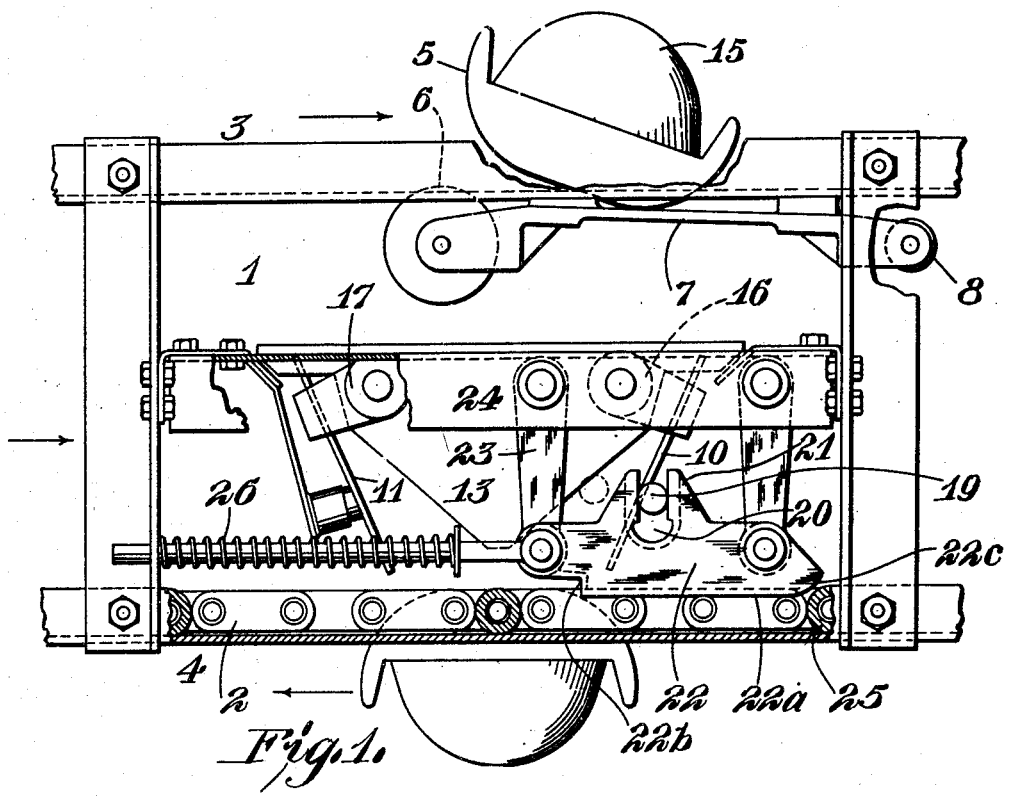
Fig.1.
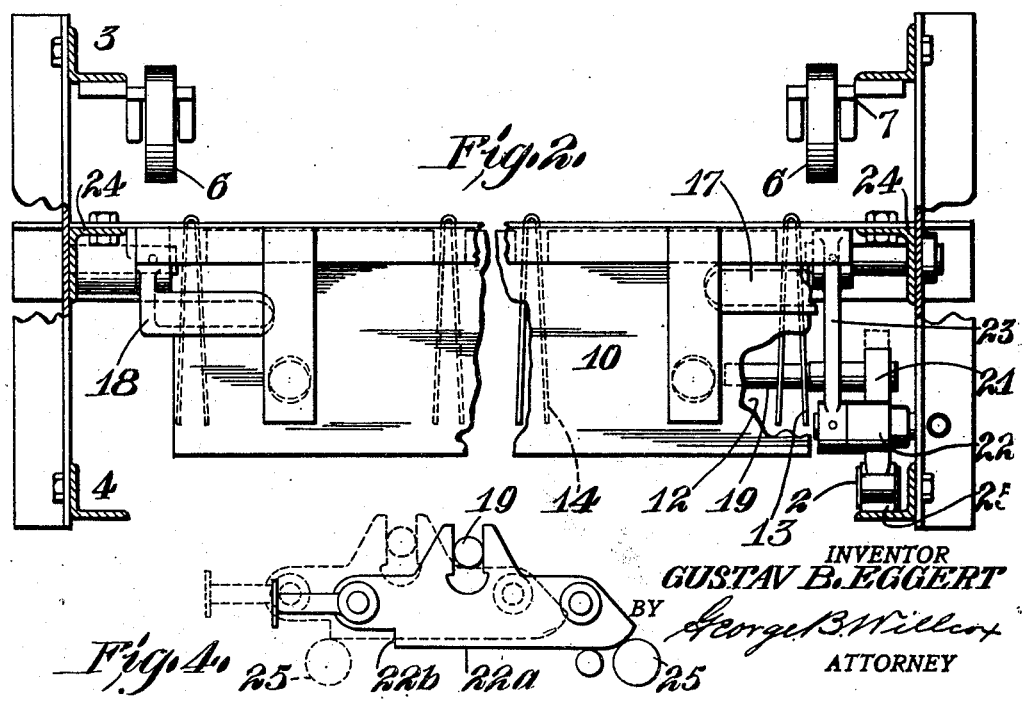
Fig.2.
Fig.4.
INVENTOR
GUSTAV B. EGGERT
BY George B Willcox
ATTORNEY Sept. 15, 1931.   G. B. EGGERT   1,823,441
PROOFER
Filed Aug. 5, 1929   4 Sheets-Sheet 2
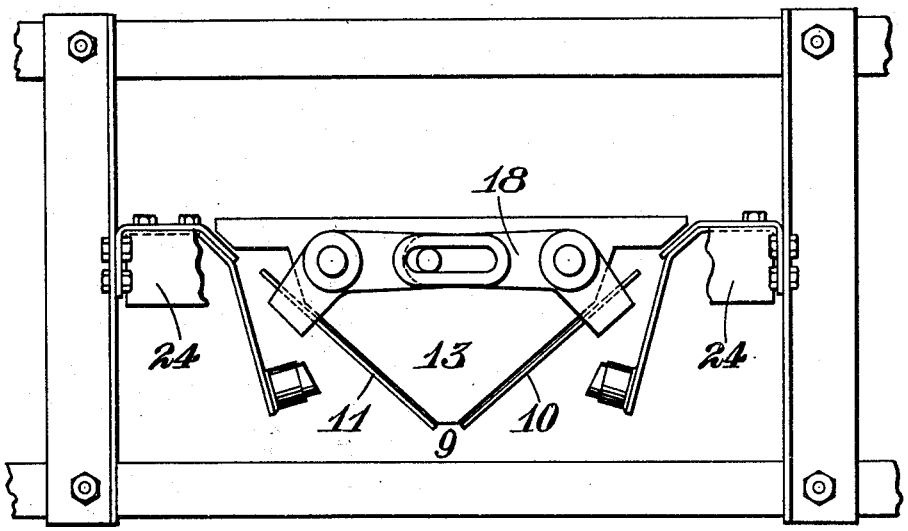
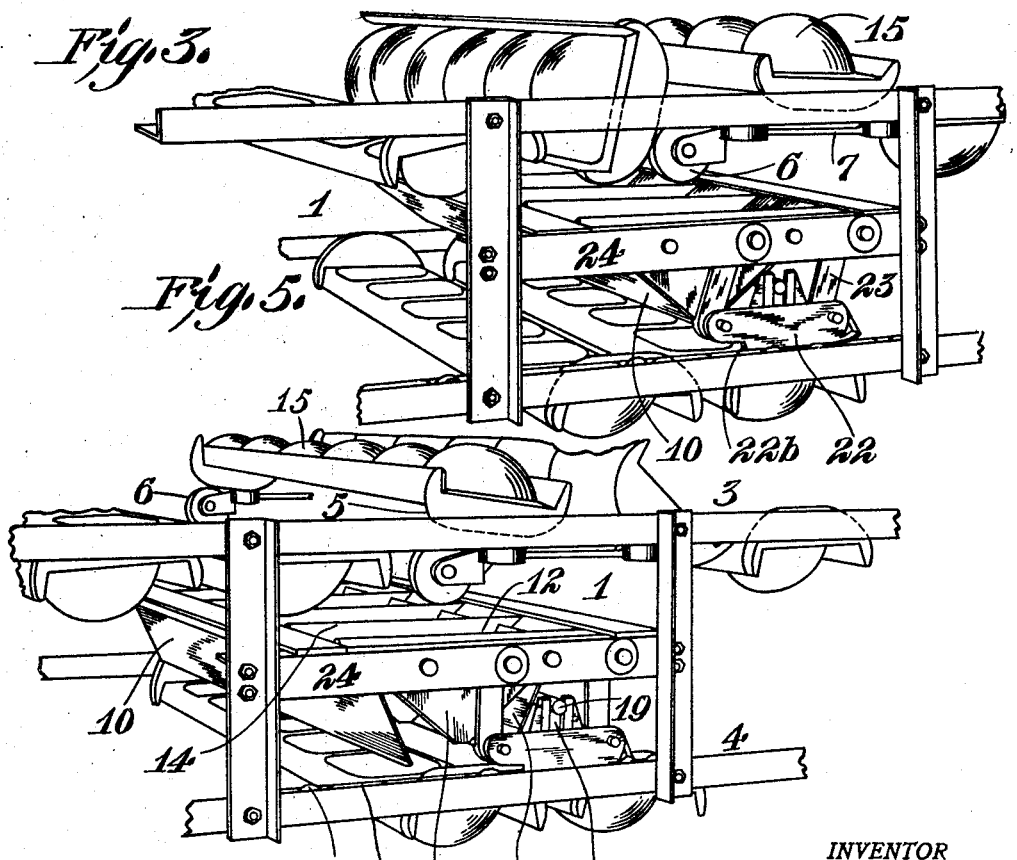
INVENTOR
GUSTAV B. EGGERT
BY George B. Willcox
ATTORNEY

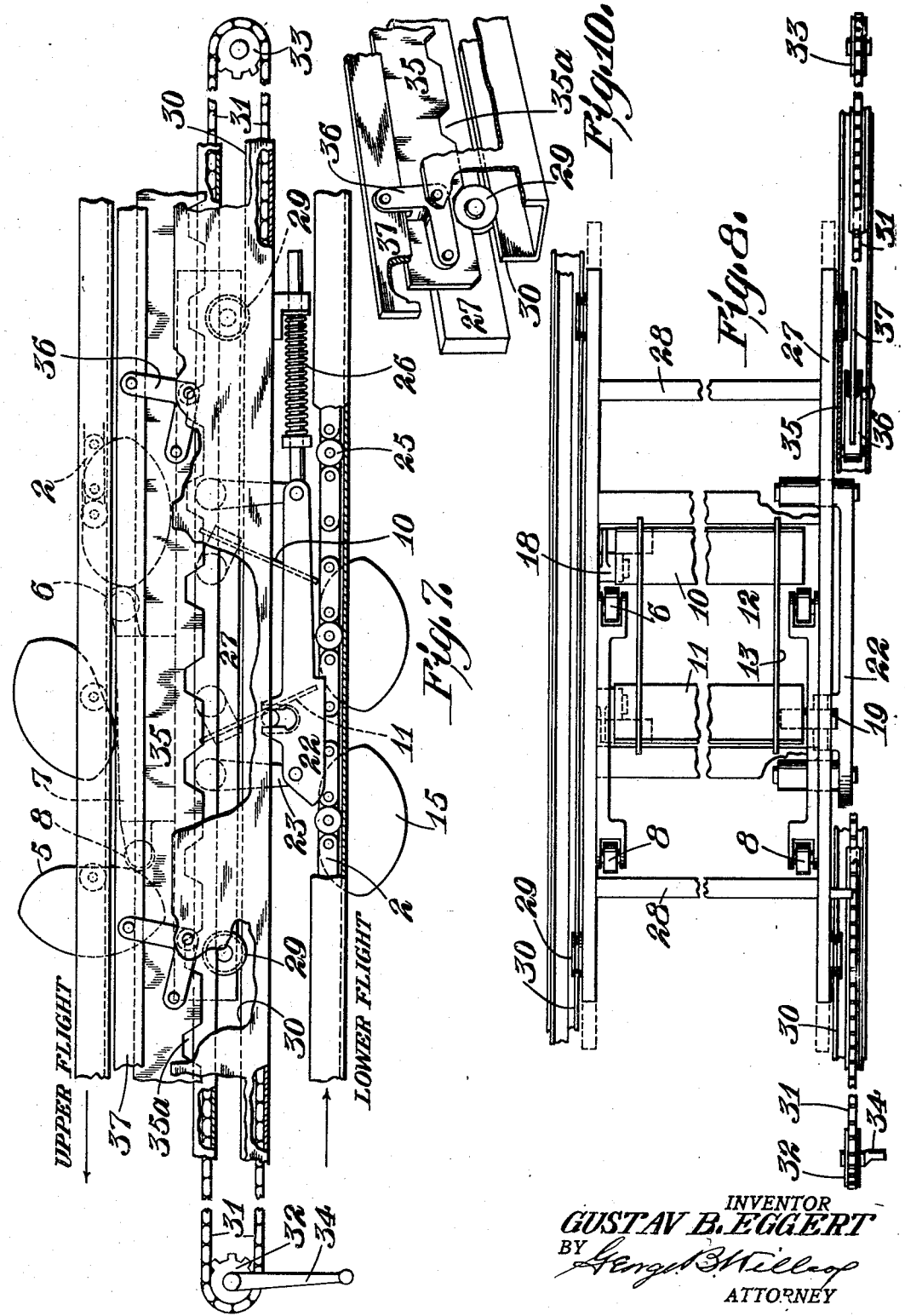

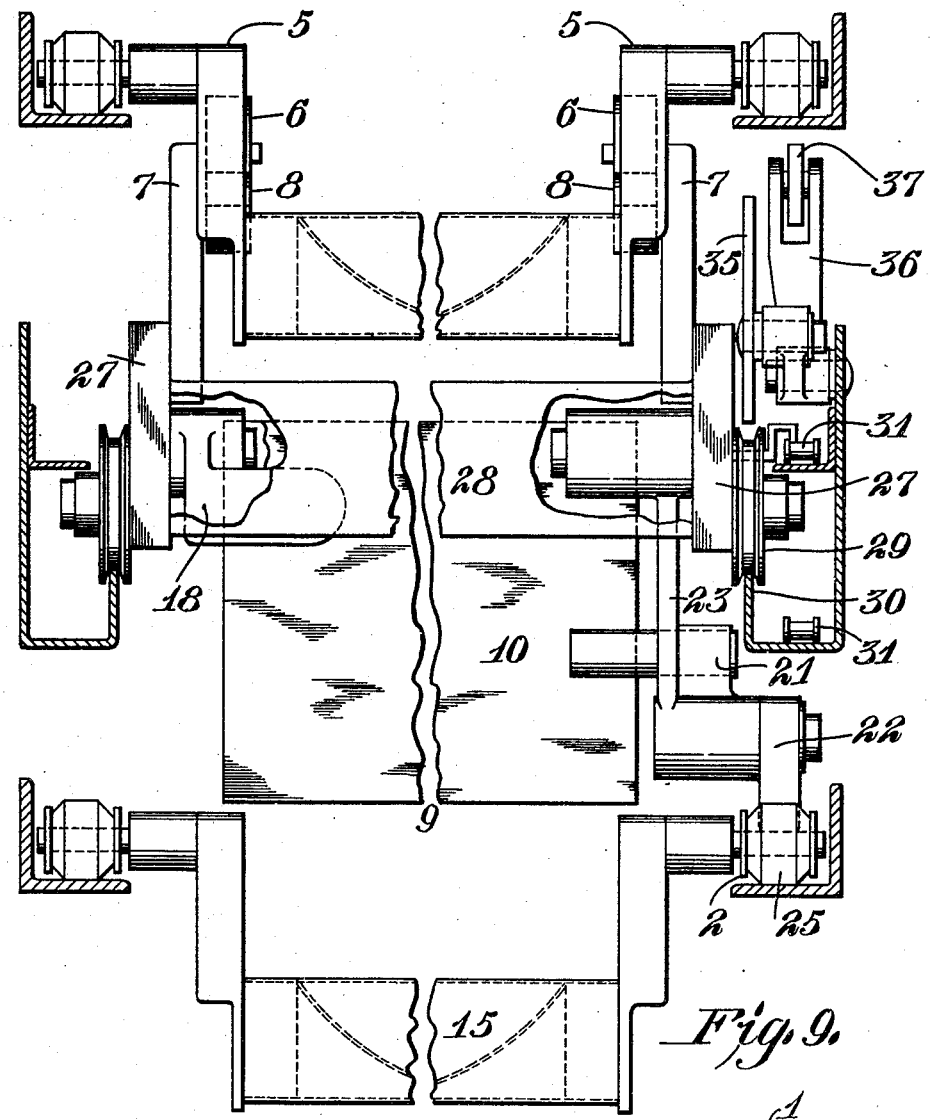
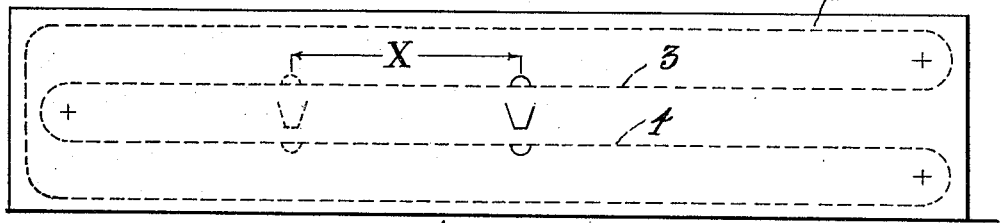
Fig. 9.
Fig. 11.
INVENTOR
GUSTAV B. EGGERT
BY
ATTORNEY

Patented Sept. 15, 1931

1,823,441

UNITED STATES PATENT OFFICE

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK

PROOFER

Application filed August 5, 1929. Serial No. 383,477.

This improvement pertains to dough proofers having continuous traveling conveyors to carry dough pieces along a circuitous path within the proofing chamber.

The invention relates to means, which I term the transpositor, whereby dough pieces during their circuitous travel and upon arriving at a predetermined point on a designated flight of the conveyor are discharged in regular order from their tray and fall accurately into an empty tray of a flight below. Each dough piece, during its fall, turns upside down and drops into a dough-piece catcher from which it is suddenly released in exact timing with the arrival of the lower tray. The catcher is thereafter reset to its original position.

The purposes served by these manipulations are as follows:

During the first part of the proofing operation the exposed upper part of the loaf has developed its crust texture. Thereupon, turning the partly proofed dough piece upside down and depositing it in the lower tray exposes its damp sticky surfaces, previously in contact with the tray walls, and expedites the proofing action. Very little dusting flour is required because the lower tray, having traveled empty for some time, is partly dry. In consequence the texture of the finished loaf is improved.

Catching the dough piece as it falls, and then suddenly releasing it in timed-in relation with the arrival of the lower tray is advantageous, because if some dough pieces were to adhere for a moment to their inverted tray of the upper flight, the receiving tray of the lower flight might pass beyond the point where it should be to receive them. This invention provides means by which the falling pieces are arrested until an empty tray has been momentarily positioned to receive them.

Whenever trays of the lower flight fail to synchronize with those of the upper flight at the inversion point, due to chain stretch or other cause, the catcher serves as a timing-in means by retarding dough pieces that have fallen a little too late or too early, until the tray which is due to receive them is positioned. The catcher thereupon releases them.

The foregoing statements of the objects of the invention have to do with the transpositor as a mechanism adapted for use at a fixed place in the length of a proofer conveyor. The invention further includes means by which the operator can shift the dough piece catcher and its associated parts to whatever place he may desire along the length of two superimposed conveyor flights, thereby varying the length of time that the dough is subjected to proofing without changing the length of travel of the conveyor in the chamber and without altering its speed. Such changes in proofing time may be very slight or they may be considerable, appropriate to the baker's requirements and to differences in physical condition of the dough pieces to be proofed.

With the foregoing and certain other objects in view which will appear later in the specification, the invention comprises the devices described and claimed and the equivalents thereof.

In the drawings Fig. 1 is an end view, partly broken away, of a transpositor as seen from the side of a proofer, showing the tray tilting mechanism and the actuating device for the dough piece catcher.

Fig. 2 is a front view, broken away, of the dough piece catcher shown in Fig. 1.

Fig. 3 is a view of that end of the dough piece catcher remote from the end shown in Fig. 1.

Fig. 4 is a side view of the catcher actuating shoe, its movement indicated by dotted lines.

Fig. 5 is a detail view in perspective of the parts shown in Fig. 1, the doors of the dough piece catcher closed.

Fig. 6 is a similar view, the doors open.

Fig. 7 is a side view, broken away, of the upper and lower flights, the transpositor, and the carriage mechanism by which the transpositor is shifted to different positions and locked.

Fig. 8 is a top plan view of the transpositor frame.

Fig. 9 is an end view of the parts shown in Fig. 7, enlarged.

Fig. 10 is a perspective detail of the carriage locking device.

Fig. 11 is a diagram showing the manner of shifting the transpositor along the conveyor flights.

In the drawings numeral 1 designates the usual proofing chamber equipped with the customary conveyor 2, here shown as arranged in successive flights that travel along a circuitous path throughout the chamber.

It is to be understood that the invention can be applied to any proofer conveyor which is arranged to present an upper flight 3 equipped with tiltable trays and a lower flight 4 whose trays may or may not be tiltable. If the conveyor is in the form of a single endless belt whose flights overfold with respect to each other, as indicated diagrammatically in Fig. 11, all the trays are made tiltable, but if the conveyor is in the form of two or more endless belts placed one above the other, then only the trays of the upper one need be tiltable. The upper and lower flights may travel in opposite directions, or in the same direction, and at the same or different speeds, depending upon various circumstances of use, without departing from the invention as claimed herein.

Along the path of travel of the upper flights is a device that tilts each tray in proper sequence to drop out its dough pieces, upside down. In Figs. 1 and 7 is shown a preferred form of tray-tilting device which will now be described.

An end of each tray is formed with a cam surface 5 adapted to travel into contact with a stationary abutment, preferably a roller 6. The cam 5 is so shaped as to turn the tray upside down while passing roller 6. Cam 5 then moves along the downwardly sloping surface of a bracket 7, tilting the tray still farther in its direction of travel as it progresses, and passes off the end of bracket 7. A second abutment or roller 8 in the path of cam surface 5 gently rights the tray. Each tray thus makes a complete revolution about its pivotal axis during the discharging operation. Whilst a tray is being tilted the dough pieces carried by it roll out of their respective pockets, fall far enough to complete half a revolution and are caught by dough-piece catcher 9 situated just above the lower flight, constituting an arresting and quick-releasing element.

Dough piece catcher 9 is primarily a spring-actuated trap door, or, preferably, a pair of such doors 10, 11 arranged as a trap bottom for a trough-like hopper 12. The trough, as shown in Figs. 5 and 6, consists of end members 13 and partitions 14 that divide the hopper into compartments corresponding to tray pockets 15.

Doors 10, 11 are preferably carried by pivoted lugs 16, 17. The doors are linked together by a toggle joint 18, as shown in Fig. 3, so when one door is opened or closed the other opens or closes simultaneously. One of the doors 10 has a pin 19 projecting from its end and received in a slot 20 in the upper part 21 of a movable shoe 22 that together with its associated parts constitutes a preferred form of tripping and resetting device for the catcher, as will now be described.

Shoe 22 is suspended from parallel arms 23 whose upper ends are pivotally fastened to a frame 24, so that when an abutment member, preferably in the form of a chain roller 25, carried by the lower conveyor flight, engages the shaped face 22c of shoe 22 it forces the shoe forward and upward, as shown by dotted lines in Fig. 4, closing the hopper doors 10, 11 against the resistance of a resilient spring 26. The doors remain closed while roller 25 passes along the sole or face 22a of shoe 22 to its heel, where there is a cut-out portion 22b. Roller 25 passes 22b and thereby releases the shoe and spring 26 snaps the shoe suddenly back into its original position. Doors 10, 11 thereupon suddenly open under the dough pieces, which drop into their respective pockets 15 of the lower tray, the movement being so sudden there is no likelihood of dough pieces adhering to the doors.

The shoe 22 is positioned with respect to rollers 25 and with the arrival of trays on the lower flight into register with the catcher so as to permit escape of dough pieces from the catcher while a tray of the lower flight is in register with the catcher and at no other time.

Should it happen that an empty tray of the lower flight arrives in exactly timed relation with the fall of dough pieces from the upper flight the trap door will be found open and the pieces will fall straight through. If, however, the empty tray has arrived beneath the trap door before the upper tray has discharged its dough pieces, then the doors open and close while the catcher is empty and that particular lower tray passes on beneath the catcher without receiving any dough pieces. The next tray of the lower flight receives them.

In the foregoing description it has been assumed that the transfer point at which the dough pieces are inverted and dropped from the upper flight into the trays of the lower flight is a fixed point. I shall now describe how that transfer point can be adjusted by being shifted at will to various places along the length of the upper and lower flights, in the manner indicated diagrammatically at X in Fig. 11, whereby to alter the proofing time to meet various conditions imposed by the requirements of the baker, and to suit variations in the character of the dough pieces to be proofed.

The tray inverting rollers 6 and 8 with their bracket 7, also the hopper with its doors 10, 11 and the shoe 22 and spring 26 are all mounted on a wheeled carriage, shown in Figs. 7, 8 and 9, whose frame consists of longitudinal members 27 and cross pieces 28.

The frame has wheels 29 running on tracks 30, extending lengthwise the proofer. An endless chain or cable 31, fixed to the frame, passes over sprockets or drums 32, 33 at either end of the proofer. Sprocket 32 at the control end has a crank 34 or a hand wheel by which the operator can at any time move the transpositor to any desired place between the upper and lower flights, thereby accomplishing one of the stated objects of the invention.

To insure placing the transpositor in register with the upper and lower proofer trays at the instant of transferring I provide, as shown in Fig. 10, a locking bar 35 extending lengthwise the proofer, having spaced notches 35a to engage and block wheels 29 when bar 35 is lowered.

Bar 35 is carried by bell cranks 36, whose arms are actuated to and fro by a draw bar 37, so the operator, stationed at the control end of the proofer, can at will release, shift and lock the transpositor.

It is now apparent that the dough piece catcher and its timing device renders it impossible for any slight change in the length of the conveyor occasioned by wear or otherwise, or for any other inaccuracy of the operation of the conveyor chains, to cause this apparatus to deliver dough pieces improperly timed with respect to the lower trays.

Having thus described my invention, what I claim and desire to secure by Letters Patent is:

1. In a dough-piece proofer having at least two parallel horizontal tray conveyor flights traveling in opposite directions one below the other, a carriage disposed in the space between said flights and supported for movement lengthwise thereof, a carriage-shifting mechanism, a carriage-gripper adapted to engage and hold the carriage immovably in a selected location along said flights, an abutment member on said carriage positioned in the path of travel of trays of the upper flight and adapted to engage and overturn them consecutively, a dough-piece catcher mounted on the carriage, a spring-impelled shoe mounted for reciprocatory movement on the carriage and operatively connected to said catcher, shoe-constraining means associated with each traveling tray of said lower conveyor flight, and a shoe-releasing device operable while a tray is in register with the catcher, and at no other time.

2. In a proofer having two parallel horizontal conveyor flights traveling in opposite directions one below the other, the upper flight having tiltable trays, a carriage movable lengthwise between said flights, a lock for securing the carriage in any adjusted location, an abutment on said carriage for tripping the trays of the upper flight one by one, a dough-piece catcher including a trap bottom on the carriage and closing devices for said trap-bottom, means operated by said lower flight for actuating said closing devices, and a spring release latch controlled by said lower flight, for the purposes set forth.

3. In a proofer having two conveyor flights one below the other, a carriage movable lengthwise between said flights, a locking device for securing the carriage in a selected position, means mounted on the carriage for effecting the discharge of dough-pieces from consecutive trays of said upper flight, a dough-piece arrester mounted on said carriage including a yieldingly displaceable shoe organized for closing and for suddenly releasing the arrester, shoe-actuating means associated with each tray of said lower flight adapted to engage and displace said shoe and to thereafter release the same while a tray is in register with the arrester, and at no other time.

4. In a proofer having therein an upper conveyor flight equipped with tiltable trays and a lower flight also carrying trays, a transpositor comprising a tray-tilter located in the path of travel of the trays of the upper flight and adapted to invert them in sequence, a dough-piece catcher stationed between said flights, quick-acting dough-piece releasing mechanism operable when an empty tray of the lower flight is in register with said catcher, catcher resetting mechanism, and means for shifting the position of said transpositor lengthwise said flights whereby to alter the duration of the proofing period.

5. In a proofer having a conveyor carrying tiltable trays, a dough-piece catcher disposed between two superimposed flights of said conveyor, spring-actuated quick opening mechanism for said catcher, a catcher release device operatively connected to the lower flight to release the catcher while a tray of said flight is in register with the catcher, and catcher re-setting mechanism, for the purposes set forth.

6. In combination with a conveyor having tiltable trays and arranged to define an upper flight and a lower flight spaced apart in substantially parallel relation and arranged for continuous travel in opposite directions, an abutment in the path of travel of the trays of the upper flight adapted to engage and invert the trays in sequence, a catcher between said flights positioned to receive dough pieces falling from the upper flight and provided wi h release mechanism actuated by the lower flight to release dough pieces from said catcher only while a tray of said lower flight is in register therewith and re-setting devices for said catcher actuated by said conveyor.

7. In a proofer an upper tray-conveyor flight equipped with means for discharging dough-pieces therefrom consecutively and a lower tray conveyor flight, a dough-piece arresting element normally positioned to engage dough-pieces during their descent from the upper to the lower flight, a releasing device for said element including a displaceable shoe, rollers carried by the lower flight and positioned with respect to the trays thereof to displace said shoe periodically and to release the same in timed-in relation with the arrival of successive trays of said lower flight into register with said catcher, for the purposes set forth.

8. In a proofer an upper traveling tray conveyor flight equipped with means for discharging dough pieces therefrom consecutively at a predetermined place in the travel thereof, a lower tray-conveyor flight, a dough piece catcher stationed in the space between said flights, spring-actuated catcher tripping and resetting levers, abutment members carried by said lower flight adapted to periodically actuate said resetting levers and to release the same in timed-in relation with the arrival of successive trays of said lower flight into register with said catcher, for the purposes set forth.

9. In a proofer enclosing two traveling tray conveyor flights arranged one above the other, the trays of the upper flight tiltable, means associated therewith for tilting trays in succession at a predetermined place to discharge dough pieces therefrom, a quick-opening dough-piece catcher disposed between said flights, a catcher-release device timed-in with and operable by the lower flight when a tray thereof comes into register with the catcher, and means actuated in co-operation with the conveyor mechanism for re-setting the catcher, for the purposes set forth.

10. In combination with a conveyor equipped with tiltable trays and arranged to define an upper flight and a lower flight spaced apart, tray-tilting means adapted to invert the trays of the upper flight in sequence, a dough-piece catcher beneath said upper flight positioned to arrest dough pieces dropped therefrom, catcher release mechanism operatively connecting said catcher with trays of the lower flight of said conveyor in succession and timed-in therewith for releasing the catcher to permit escape of dough pieces therefrom only while a tray of said lower flight is in register with the catcher, and re-setting devices for said catcher operated by said lower flight.

11. In a proofer having a plurality of trays traveling in superposed conveyor flights, a transpositor located between two oppositely moving flights and comprising in combination a tray-tilter for discharging dough pieces from trays of the upper flight, a dough-piece arrester and arrester-release mechanism operable only when the arrester is in register with successive trays of the lower flight.

12. A proofer having a plurality of trays traveling in superposed conveyor flights, a transpositor between said flights comprising means for inverting trays of an upper flight, a dough-piece arrester between said flights, arrester-release mechanism, abutments on said lower flight successively engaging said release mechanism in timed-in relation with the arrival of a tray of said lower flight into register with the dough-piece arrester.

13. In a proofer having two parallel conveyor flights traveling one below the other and tray-emptying means in conjunction with the upper flight, a dough-piece catcher between said flights positioned to receive dough pieces discharged from said upper flight, a trap bottom for said catcher, and a quick-opening mechanism connected with said trap bottom and actuated by said lower conveyor flight.

14. In a proofer including an upper tray-conveyor flight equipped with means for discharging dough-pieces therefrom consecutively, a lower tray-conveyor flight, a dough-piece catcher in the space between said flights, a catcher tripping and resetting cam, abutment members associated with the trays of said lower flight to operably engage said cam and to release the same in timed-in relation with the arrival of successive trays of said lower flight into register with said catcher, for the purposes set forth.

In testimony whereof, I affix my signature.

GUSTAV B. EGGERT.